United States Patent Office 3,632,609
Patented Jan. 4, 1972

3,632,609
METHOD FOR THE PREPARATION OF (CIS-1,2-EPOXYPROPYL) PHOSPHONIC ACID AND DERIVATIVES THEREOF
Raymond A. Firestone, Fanwood, and Edward J. Glamkowski, Plainfield, N.J., assignors to Merck & Co., Inc., Rahway, N.J.
No Drawing. Filed May 15, 1968, Ser. No. 729,467
Int. Cl. C07f 9/38, 9/40
U.S. Cl. 260—348 R                       11 Claims

ABSTRACT OF THE DISCLOSURE

A method for the preparation of (cis-1,2-epoxypropyl) phosphonic acid and its salts and ester derivatives which comprises treating a (1-haloethoxy methylphosphine acid or a salt or ester thereof with a metallic hydride, with an alkali metal amide or with an organo-metallic reagent capable of effecting epoxide-type ring closure. The (cis-1,2-epoxypropyl)phosphonic acid product thus obtained and its salts are antibiotics which have utility as antibacterials in inhibiting the growth of gram-positive and gram-negative pathogenic bacteria.

---

This invention relates to a novel method for the preparation of (cis-1,2-epoxypropyl)phosphonic acid and its salts and ester derivatives via ring closure of an (haloethoxy)methylphosphonic acid or a salt or ester derivative thereof.

The (±) and (−) (cis-1,2-epoxypropyl)phosphonic acid product of the instant process and its salts are antimicrobial agents, which are useful in inhibiting the growth of gram-positive and gram-negative pathogenic bacteria. The (−) form, and particularly its salts such as the sodium and calcium salts, are active against Bacillus, Escherichia, Staphylococci, Salmonella and Proteus pathogens, and anti-biotic-resistant strains thereof. Illustrative of such pathogens are *Bacillus subtilis*, *Escherichia coli*, *Salmonella schottmuerlieri*, *Salmoneila gallinarum*, *Salmonella pulluroum*, *Proeus vulgaris*, *Proteus mirabilis*, *Proteus morganii*, *Staphylococcus aureus* and *Staphylococcus pyrogenes*. Thus, (±) and (−) (cis-1,2-epoxypropyl)phosphonic acid and the salts thereof can be used as antiseptic agents to remove susceptible organisms from pharmaceutical, dental and medical equipment and can also be used in other areas subject to infection by such organisms. Similalry, they can be used to separate certain microorganisms from mixtures of microorganisms. The salts of (−) (cis-1,2-epoxypropyl)phosphonic acid are particularly valuable because not only do they have application in the treatment of diseases caused by bacterial infections, but they are active against resistant strains of pathogens. The said salts constitute a preferred embodiment of this invention because they are effective when given orally, although it is to be noted that they can also be administered parenterally.

In accordance with this invention (cis-1,2-epoxypropyl) phosphonic acid and its salts and ester derivatives (I, infra) are obtained by treating a (1-haloethoxy)methylphosphonic acid or a salt or ester thereof (II, infra) with a metallic hydride, with an alkali metal amide or with an organo-metallic reagent. If the reactant is a (1-haloethoxy)methylphosphonic acid then the product is usually obtained in the form of its metal salt by virtue of the reaction of the said acid with the metallic hydride, alkali metal amide or organo-metallic reagent and the salt thus obtained may be isolated as the product or, if desired, the said salt may be converted to its corresponding acid by passing an aqueous solution thereof through a cation-exchange column on the hydrogen cycle. However, if an ester of the (1-haloethoxy)methylphosphonic acid reactant is employed then the resulting product is an ester derivative which can either be isolated per se as a product of the invention or the said ester may be converted to the desired (cis-1,2-epoxypropyl)phosphonic acid by hydrogenolysis, by treatment with an aqueous solution of a mineral acid such as hydrochloric acid or sulfuric acid under carefully buffered conditions or by treatment with trimethylchlorosilane followed by aqueous hydrolysis. The following equation illustrates the process of this invention:

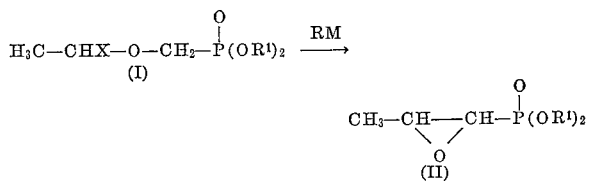

wherein $R^1$ is hydrogen, lower alkyl, such as methyl, ethyl, n-propyl, isopropyl, n-butyl, n-amyl, and the like, lower alkenyl such as as allyl and the like, lower alkynyl such as propynyl and the like, aryl such as phenyl, naphthyl, and the like, aralkyl such as benzyl, phenethyl, menaphthyl, and the like, or the cation derived from an alkali metal or alkaline earth metal such as the cation derived from sodium, lithium, potassium, magnesium or calcium metal; RM is a metallic hydride such as lithium hydride, sodium hydride, potassium hydride and the like, an alkali metal amide such as sodamide, potassium amide and the like, or an organometallic reagent such as organo-lithium, organo-rubidium or organo-cesium and the like, wherein the organo moiety corresponding to R in the above formula is an hydrocarbyl radical, i.e., an organic radical composed solely of carbon and hydrogen, such as alkyl, for example, methyl, ethyl, n-propyl, n-butyl, and the like, lower alkenyl, for example, allyl and the like, aryl, for example, phenyl, naphthyl and the like, or aralkyl, for example, benzyl, menaphthyl, and the like and X is halo such as chloro, bromo, fluoro, iodo and the like; and when $R^1$ in the above equation represents a moiety other than hydrogen then the resulting (cis-1,2-epoxypropyl)phosphonate can either be isolated per se as a product of the invention or the corresponding salt or ester derivative can be converted to the desired acid via the methods described The application of heat and the choice of a solvent are not critical aspects of the invention and, in general, the reaction may be conducted at temperatures in the range of from about the freezing point up to the boiling point of the reaction medium. However, as a practical matter it is most desirable to conduct the reaction in the range of from about −78° C. up to about 100° C. Also, according to a preferred embodiment of this invention, when the starting material is an ester of [(1-haloethoxy) methyl]phosphonic acid, the reaction mixture is preferentially maintained at a temperature of from about 0° C. up to about 50° C. and when the starting material is the free [(1-haloethoxy)methyl]phosphonic acid or a salt thereof it is most desirable to conduct the reaction at a temperature in the range of from about 50° C. up to about 100° C.

The process may be conducted in any solvent or combination of solvents in which the starting materials are reasonably soluble and which is substantially inert with respect to the reactants employed. Suitable solvents include, for example, hydrocarbons such as pentane, hexane, benzene and the like and ethers such as tetrahydrofuran, dioxane, ethyl ether, 1,2-dimethoxyethane and the like; however, the ether solvents have proved to be a particularly suitable media in which to conduct the reaction and therefore constitute the solvents of choice in this process.

In practice, it is only necessary to dissolve or suspend the [(1-haloethoxy)methyl]phosphonic acid reactant or its corresponding salt or ester (II) in the solvent and then add the metallic reagent in order to effect ring closure. In general, a 1–10% concentration of the reagent in the solvent is adequate but concentrations in the range of from about 1–4% are preferred. Also, in general, it is practicable to employ an approximately equivalent amount of reactant and ring closing agent when the starting material is a salt or ester of [(1-haloethoxy)methyl] phosphonic acid; however, when the free acid, i.e., [(1-haloethoxy)methyl]phosphonic acid, is employed it is desirable to use three times the amount which would be employed in the case of the corresponding salt or ester reactant. Also, when the starting material is a salt of the phosphonic acid reactant, it has been found most desirable to employ an alkali metal amide or an organo-lithium reagent as the ring closing agent and, in addition, to conduct the reaction at a temperature in the range of from 50° C. to about 100° C.

The nuclear carbons comprising the epoxide ring in the instant products (I) are asymmetric in character and, therefore, the products (I) may be obtained either as a racemic mixture or in the form of one or more of four optically active isomers. In this process the reaction proceeds via a displacement of the X substituent in the n-propylphosphonic acid molecule (II, infra):

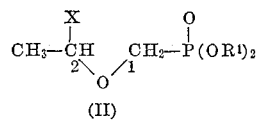

(II)

The formation of the epoxide product takes place via an inversion of the absolute configuration at the 2-carbon and, therefore, in principle it is possible to effect the synthesis of any particular optically active product by simply selecting as the reactant in the process the appropriate optically active starting material. In terms of the Cahn-Ingold-Prelog convention, when optically active (−) (cis-1,2-epoxypropyl)-phosponic acid is desired, it is only necessary to select as the starting material the corresponding 2S (1-haloethoxy)methyl phosphonic acid precursor. In this connection it should be noted that the (−) (cis-1,2-epoxypropyl)phosphonic acid thus obtained and its salts are particularly effective in inhibiting pathogenic bacteria and, thereby, the preparation of that particular isomer constitutes a preferred embodiment of this invention.

The (−) (cis-1,2-epoxypropyl)phosphonic acid referred to herein rotates plane-polarized light in a counter-clockwise direction (to the left as viewed by the observer) when the rotation of its disodium salt is measured in water (5% concentration) at 405 m$\mu$.

The designation cis used in describing the 1,2-epoxypropylphosphonic acid compounds means that each of the hydrogen atoms attached to carbon atoms 1 and 2 of the propylphosphonic acid are on the same side of the oxide ring.

The (1-haloethoxy)methylphosphonic acid and its salts and esters (II) which are employed as starting materials in the process of this invention are conveniently obtained by treating hydroxymethylphosphonic acid or a salt or ester thereof (III, infra) with acetaldehyde in the presence of a gaseous hydrogen halide such as hydrogen chloride, hydrogen bromide, hydrogen fluoride, hydrogen iodide, etc. to yield a (1-haloethoxy)methylphosphonic acid or the corresponding salt or ester analog (II). The following equation illustrates this method of preparation:

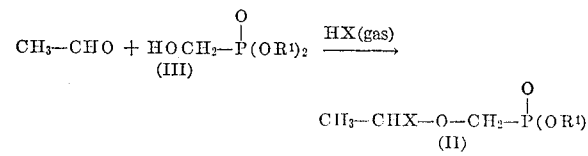

wherein $R^1$ and X are as defined above.

The hydroxymethylphosphonic acid esters (III) employed as the reactants in the foregoing synthesis are either known compounds or can be obtained by methods well known to those skilled in the art. Thus, for example, the said esters may be synthesized by treating a suitable alcohol with phosphorus trihalide in the presence of a strong base followed by the reaction of the phosphite derivative (IV, infra) thus obtained with additional phosphorus trihalide to yield a halophosphine (V, infra) and the resulting phosphine intermediate is then converted to the corresponding phosphinic acid diester (VI, infra) by treatment with a base and then to the desired hydroxymethylphosphate (IIIa) via treatment with a stoichiometric excess of formaldehyde. The following equation illustrates this method of preparation:

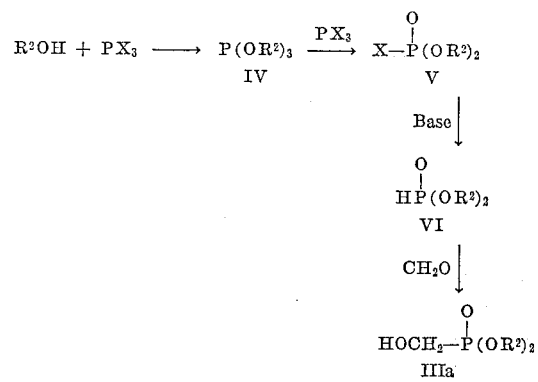

wherein $R^2$ is an hydrocarbyl radical such as the lower alkyl, lower alkenyl, aryl or aralkyl radicals defined above in respect of the definition of $R_1$; $PX_3$ is a phosphorus trihalide such as phosphorus trichloride, phosphorus tribromide, phosphorus triiodide and the like; and X is as defined above. Suitable bases which may be used in converting the halophosphine intermediate (V) to the phosphinic acid diester (VI), are sodium bicarbonate, potassium bicarbonate and the like.

In addition to the foregoing, the dimethyl ester of hydroxymethylphosphonic acid (IIIb, infra) may also be obtained by treating the known free acid with diazomethane according to the following equation:

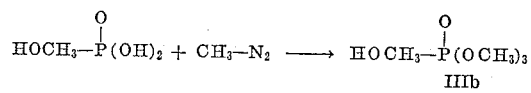

The dimethyl hydroxymethylphosphonate (IIIb) thus obtained may be taken up in benzene to be used directly in the synthesis described above for the preparation of the (1-haloethoxy)methylphosphonic acid reactant or its corresponding phosphonate (II).

The following examples illustrate the method by which (cis-1,2-epoxypropyl)phosphonic acid and its salts and ester derivatives (I) may be obtained. However, the examples are illustrative only and should not be construed as being limited thereto since other functionally equivalent reagents may be substituted for the hydroxymethylphosphonic acid, hydroxymethylphosphonates and metallic coupling agents recited therein to yield an identical (cis-1,2-epoxypropyl)phosphonic acid product and its corresponding salt and ester derivatives thereof.

EXAMPLE 1

(Cis-1,2-epoxypropyl)phosphonic acid and disodium salt

Step A: Dimethyl hydroxymethylphosphonate.—Hydroxymethylphosphonic acid (10.0 g.) is treated with two equivalents of diazomethane in 300 ml. of ether. The ether is then evaporated and the dimethyl hydroxymethylphosphonate thus obtained is taken up in benzene (50 ml.) to be used directly in the following step.

Step B: Dimethyl (1-chloroethoxy)methylphosphonate.—Acetaldehyde (1.1 equivalents) is added to the solution of dimethyl hydroxymethylphosphonate in benzene obtained according to Step A and the solution is saturated at 10–15° C. with anhydrous hydrogen chloride (gas). After aging overnight at 25° C. the benzene is distilled out in vacuo and the residue is then flushed three times with benzene to remove all traces of hydrogen chloride. The compound thus obtained is identified as dimethyl (1-chloroethoxy)methylphosphonate.

Step C: Dimethyl (cis - 1,2 - epoxypropyl)phosphonate.—Ether is added (500 ml.) to the crude dimethyl (1-chloroethoxy)methylphosphonate obtained according to Step B and to the solution is added, at 25° C. over the course of two hours, a solution of 0.9 equivalent of phenyllithium in ether. After stirring for one-half hour the solution is filtered and fractionally distilled in vacuo to yield dimethyl (cis-1,2-epoxypropyl)phosphonate.

Step D: (Cis-1,2-epoxypropyl)phosphonate acid and disodium salt.—Dimethyl (cis-1,2-epoxypropyl)phosphonate (1 m. mole) in trimethylchlorosilane (10 cc.) is refluxed for eight hours and the reaction mixture is extracted with water to yield an aqueous solution of (cis-1,2-epoxypropyl)phosphonic acid. The product thus obtained is then treated with two equivalents of sodium hydroxide and the solution evaporated to yield disodium (cis-1,2-epoxypropyl)phosphonate.

EXAMPLE 2

(Cis-1,2-epoxypropyl)phosphonic acid and disodium salt

Step A: (1-Bromoethoxy)methylphosphonic acid.—Acetaldehyde (1.1 mole) in hydroxymethylphosphonic acid (1 mole) in benzene (500 ml.) are saturated with hydrogen bromide gas at 10–15° C. The mixture is allowed to stand at 25° C. for 24 hours, then solvent distilled out in vacuo and the residue flushed three times with benzene to remove all traces of hydrogen bromide. The oily residue thus obtained is (1-bromoethoxy)-methylphosphonic acid.

Step B: Disodium salt of (cis-1,2-epoxypropyl)phosphonic acid.—(1 - bromoethoxy)methylphosphonic acid (1.0 g.) is added with stirring to a solution of tetrahydrofuran containing three equivalents of sodium hydride. The reaction mixture is allowed to stand at room temperature for four hours and is then filtered, evaporated and treated with water. The aqueous solution is then filtered and evaporated in vacuo to yield the disodium salt of (cis-1,2-epoxypropyl)phosphonic acid.

Step C: (Cis-1,2-epoxypropyl)phosphonic acid.—The disodium salt of (cis-1,2-epoxypropyl)phosphonic acid obtained according to Step B is taken up in 20 ml. of water and passed through a column containing 25 g. of an ion-exchange resin (Amberlite I.R. 120 resin) on the hydrogen cycle. Elution with 20 ml. of water yields free (cis-1,2-epoxypropyl)phosphonic acid.

EXAMPLE 3

(Cis-1,2-epoxypropyl)phosphonic acid and calcium salt

Step A: Diethyl hydroxymethylphosphonate.—To a solution of ethanol (10.0 g.) and one equivalent of triethylamine in 100 ml. benzene is added, over a fifteen minute period at 0° C., one-third equivalent of phosphorus trichloride. Triethylamine hydrochloride is filtered off and the solvent removed in vacuo to yield triethylphosphite which is then purified by vacuum distillation.

The distilled triethylphosphite (10.0 g.) is mixed in the cold with one-half equivalent of phosphorus trichloride, allowed to stand at room temperature for 24 hours, and the resulting product fractionally distilled in vacuo to yield diethoxy chlorophosphine. The phosphine intermediate is then hydrolyzed by pouring onto ice containing one equivalent of sodium bicarbonate. The product thus obtained is extracted with ether, dried over sodium sulfate and vacuum distilled to yield diethylphosphite.

Upon treatment with a stoichiometric excess of formaldehyde the dimethylphosphite is converted to diethyl hydroxymethylphosphonate.

Step B: Diethyl (1-iodoethoxy)methylphosphonate.—By substituting diethyl hydroxymethylphosphonate and hydrogen iodide gas for the dimethyl hydroxymethylphosphonate and hydrogen chloride recited in Example 1, Step B, and following the procedure described therein the compound diethyl (1-iodoethoxy)methylphosphonate is obtained.

Step C: Diethyl (cis-1,2-epoxypropyl)-phosphonate.—To the crude diethyl (1-iodoethoxy)methylphosphonate obtained according to Step B, is added ether (500 ml.), at 25° C. over the course of 2 hours and then a solution of 0.9 equivalent of phenylcesium in ether. After stirring for ½ hour, the solution is fractionally distilled in vacuo to yield diethyl (cis-1,2-epoxypropyl)phosphonate.

Step D: (Cis-1,2-epoxypropyl)phosphonic acid and calcium salt.—A solution of diethyl (cis-1,2-epoxypropyl)phosphonate (1 m. mole) in trimethylchlorosilane (10 cc.) is refluxed for 8 hours and the reaction mixture is extracted with water to yield an aqueous solution of (cis-1,2-epoxypropyl)phosphonic acid. The product thus obtained is then treated with two equivalents of calcium hydroxide to yield the calcium salt of (cis-1,2-epoxypropyl)phosphonic acid.

EXAMPLE 4

(—)(cis-1,2-epoxypropyl)phosphonic acid and disodium salt

Step A: 2S [(1 - chloroethoxy)methyl]phosphonic acid.—[(1-Chloroethoxy)methyl]phosphonic acid (10.0 g.) is treated with one equivalent of strychnine in 10 volumes of tetrahydrofuran and the volume of tetrahydrofuran is then reduced by evaporation until crystallization begins. The two diastereisomeric strychnine salts of [(1-chloroethoxy)methyl]phosphonic acid thus obtained are then separated by crystallization from tetrahydrofuran and the desired 2S form of [(1-chloroethoxy)methyl]phosphonic acid is regenerated from the said salt by treatment with one equivalent of anhydrous hydrogen chloride gas in a mixture of ether and benzene. Upon filtration of residual strychnine hydrochloride, the solvent is evaporated in vacuo to yield the desired 2S [(1-chloroethoxy)methyl]phosphonic acid in the form of an oil.

Step B: 2S dimethyl [(1-chloroethoxy)methyl]phosphonate.—2S [(1-Chloroethoxy)methyl]phosphonic acid (1.0 g.) is stirred with 10 ml. of benzene at 25° C. and two equivalents each of pyridine and thionyl chloride are added. After 30 minutes pyridine hydrochloride is filtered off and washed twice with benzene (1 ml.). The filtrate is evporated in vacuo below 20° C. to remove unreacted thionyl chloride and the residue is taken up in benzene (10 ml.) and treated with two equivalents each of pyridine and methanol while maintaining the emperature at approximately 20° C. Upon filtration of residual pyridine hydrochloride the filtrate is evaporated in vacuo to yield 2S dimethyl [(1-chloroethoxy)methyl]phosphonate.

Step C: Dimethyl (—)(cis-1,2-epoxypropyl)phosphonate.—2S Dimethyl (1-chloroethoxy)methyl phosphonate (1.0 g.) is added with stirring to ether (500 ml.) and to the solution is added 0.9 equivalent of methyllithium in ether. The solution is then stirred for one-half hour, filtered, and fractionally distilled in vacuo to yield dimethyl (—)(cis-1,2-epoxypropyl)phosphonate.

Step D: (—)(cis-1,2-epoxypropyl)phosphonic acid and disodium salt.—By substituting dimethyl (—)(cis-1,2-epoxypropyl)phosphonate for the dimethyl (cis-1,2-epoxypropyl)phosphonate recited in Example 1, Step D, and following the procedure described therein the products (—)(cis-1,2-epoxypropyl)phosphonic acid and the disodium salt thereof, respectively, are obtained.

EXAMPLE 5

Dipotassium salt of (cis-1,2-epoxypropyl)phosphonic acid

Step A: Dipotassium salt of (cis-1,2-epoxypropyl)phosphonic acid.—A solution of dipotassium [(1-chloroethoxy)methyl]phosphonic acid, obtained by the reaction of [(1-chloroethoxy)methyl]phosphonic acid with two equivalents of potassium hydride in tetrahydrofuran, is treated with 0.9 equivalent of potassium amide in dioxane. The reaction mixture is allowed to stand at 50° C. for several hours and then filtered, evaporated and treated with water. The aqueous solution is then filtered and evaporated in vacuo to yield the dipotassium salt of cis-1,2-epoxypropyl) phosphonic acid.

In a manner similar to that described in Example 3, (cis-1,2-epoxypropyl)phosphonic acid and all of its salts and ester derivatives may be obtained simply by substituting the appropriate starting materials for those described in Steps A-D of that embodiment. The following equation illustrates the reaction of Example 3, Steps A, B, C and D and, in conjunction with Table I, infra, describe the several varieties of phosphorus trihalides, hydrogen halides, metallic reagents and metal hydroxides which may be employed in the process of this invention and, also the (cis-1,2-epoxypropyl)phosphonic acid product and the salts and esters derived therefrom:

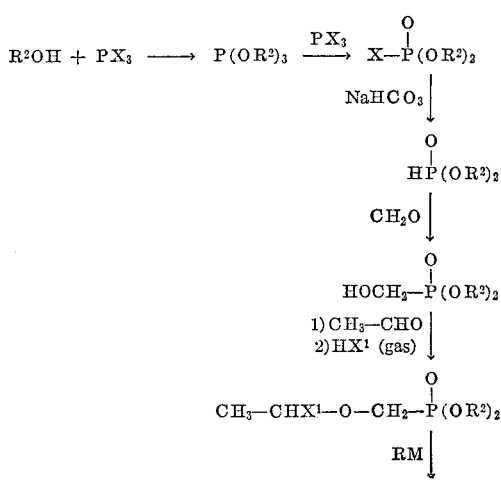

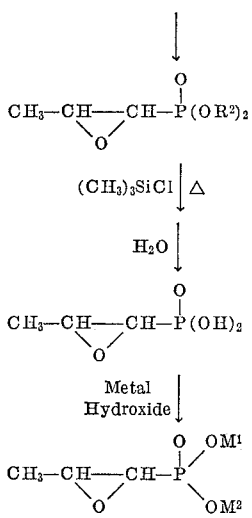

TABLE I

| Example | $R^2$ | X | $X^1$ | $M^1$ | $M^2$ | RM | Metal hydroxide |
|---|---|---|---|---|---|---|---|
| 6 | —$(CH_2)_3CH_3$ | Cl | Cl | K | K | KH | KOH |
| 7 | —⟨phenyl⟩ | Cl | F | —Mg— | | NaH | $Mg(OH)_2$ |
| 8 | —$CH_2$—CH=$CH_2$ | Br | I | Li | Li | Li—⟨phenyl⟩ | LiOH |
| 9 | —$CH_2$—$CH_2$—⟨phenyl⟩ | Br | Br | Na | Na | LiH | NaOH |
| 10 | —$(CH_2)_2CH_3$ | Cl | Cl | —Ca— | | KH | $Ca(OH)_2$ |
| 11 | —$CH_2$—C≡CH | Cl | I | K | K | NaH | KOH |
| 12 | —$(CH_2)_4CH_3$ | Br | Cl | Li | Li | LiH | LiOH |
| 13 | —$CH_2$—⟨phenyl⟩ | Br | F | —Mg— | | LiCH | $Mg(OH)_2$ |
| 14 | ⟨naphthyl⟩ | Cl | Cl | Na | Na | KH | NaOH |
| 15 | —$CH(CH_3)_2$ | Cl | I | —Ca— | | NaH | $Ca(OH)_2$ |
| 16 | —$CH_2$—⟨naphthyl⟩ | Cl | I | Li | Li | NaH | LiOH |

The products of this invention can be administered in a wide variety of therapeutic dosages in conventional vehicles as, for example, by oral administration in the form of a capsule or tablet or in a liquid solution or suspension. Suitable formulations may include diluents, granulating agents, preservatives, binders, flavoring agents and coating agents which are well known to those skilled in this particular art and the dosage of the products may be varied over a wide range as, for example, in the range of from 1.0 gram to about 8.0 grams of active ingredient for the symptomatic adjustment of the dosage to the patient to be treated.

Alternatively, the instant products (I) may be administered parenterally by injection in a sterile excipient and for this purpose it is most desirable to employ a salt of (cis-1,2-epoxypropyl)phosphonic acid which is soluble in the liquid vehicle.

It is also within the scope of this invention to combine two or more of the instant products in a unit dosage form or to combine one or more of the instant products with other known antibacterial agents.

The following example illustrates the preparation of a representative dosage; it being understood that other salts of (cis-1,2-epoxypropyl)phosphonic acid and other pharmaceutical vehicles may be substituted for the active ingredient and excipient recited therein to obtain other suitably active dosage forms:

EXAMPLE 17

Tablets containing 352.5 mg. of active ingredient per tablet

| | Per tablet, mg. |
|---|---|
| Calcium (±) (cis-1,2-epoxypropyl)phosphonate | 352.5 |
| Dicalcium phosphate | 180 |
| Lactose U.S.P. | 179.5 |
| Cornstarch | 80 |
| Magnesium stearate | 8 |
| | 800.0 |

The calcium (±) (cis-1,2-epoxypropyl)phosphonate is blended with dicalcium phosphate, lactose and 40 mg. of cornstarch. The mixture is then granulated with a 15% cornstarch paste, rough-screened, dried at 45° C. and screened through a No. 16 screen. Additional cornstarch (40 mg.) and magnesium stearate are added and the mixture compressed into one-half inch diameter tablets each weighing about 800 mg.

By substituting 330 mg. of disodium (±) (cis-1,2-epoxypropyl)phosphonate monohydrate for the disodium (±) (cis-1,2-epoxypropyl)phosphonate of the above example and otherwise following the procedure described therein a similar tablet suitable for oral administration is obtained.

It will be apparent from the foregoing description that the (cis-1,2-epoxypropyl)phosphonic acid products (I) of this invention constitute a valuable class of compounds which have not been prepared heretofore. One skilled in the art will also appreciate that the process disclosed in the above examples are merely illustrative and are capable of a wide variation and modification without departing from the spirit of this invention.

What is claimed is:

1. A method for the preparation of a compound having the formula:

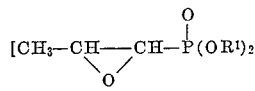

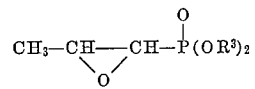

wherein $R^3$ is lower alkyl, lower alkenyl, lower alkynyl, aryl, aralkyl or the cation derived from an alkali metal of alkaline earth metal; which comprises treating a compound having the formula:

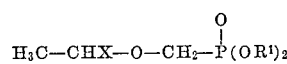

wherein X is halo and $R^1$ is hydrogen or any one of the radicals falling within the definition of $R^3$, with an alkali metal hydride, with an alkali metal amide or with an organo-metallic reagent selected from organo-lithium, organo-cesium, organo-rubidium and wherein the organo moiety is an hydrocarbyl radical.

2. A method according to claim 1 for the preparation of the alkali metal salt of (−) (cis-1,2-epoxypropyl)phosphonic acid which comprises treating 2S di-lower alkyl (1-haloethoxy)methylphosphonate with a metal hydride, with an alkali metal amide or with an organo-metallic reagent selected from organo-lithium, organo-cesium or organo-rubidium and wherein the organo moiety is an hydrocarbyl radical, followed by the conversion of the di-lower alkyl (cis-1,2-epoxypropyl)phosphonate thus obtained to the desired product by treatment with trimethylchlorosilane and then with an aqueous solution of a suitable base.

3. A method according to claim 2 for the preparation of the disodium salt of (−) (cis-1,2-epoxypropyl)-phosphonic acid which comprises treating 2S di-lower alkyl (1-chloroethoxy)methylphosphonate with methyllithium, followed by the conversion of the di-lower alkyl-(cis-1,2-epoxypropyl)-phosphonate thus obtained to the desired product by treatment with trimethylchlorosilane and then with an aqueous solution of sodium hydroxide.

4. The process of claim 1 wherein the metal hydride is an alkali metal hydride.

5. The process of claim 4 wherein the metal hydride is lithium hydride, sodium hydride or potassium hydride.

6. The process of claim 1 wherein the organo-metallic reagent is phenylcesium.

7. The process of claim 1 wherein the hydrocarbyl radical is alkyl, lower alkenyl, aryl or aralkyl.

8. The process of claim 2 wherein the organo-metallic reagent is phenyllithium.

9. A method according to claim 1 for the preparation of the disodium salt of (cis-1,2-epoxypropyl)phosphonic acid which comprises treating (1-haloethoxy)methylphosphonic acid with sodium hydride.

10. The process of claim 1 wherein $R^1$ is lower alkyl and the organo-metallic reagent employed is phenyllithium.

11. A method according to claim 1 wherein the ester of (cis-1,2-epoxypropyl)phosphonic acid thus obtained is converted to the free acid by treatment with trimethylchlorosilane followed by aqueous hydrolysis.

References Cited

UNITED STATES PATENTS

| 2,754,320 | 7/1956 | Johnston | 260—970 X |
| 3,177,226 | 4/1965 | Stilz et al. | 260—987 X |

FOREIGN PATENTS

| 435,110 | 9/1935 | Great Britian. |

OTHER REFERENCES

Theilheimer W., Synthetic Methods of Org. Chem. (1961), vol. 15, p. 520.

NORMA S. MILESTONE, Primary Examiner

U.S. Cl. X.R.

260—502.4 R, 950; 424—203